Patented Apr. 18, 1939

2,154,889

UNITED STATES PATENT OFFICE 2,154,889

COMPOUNDS OF THE PYRIMIDINE SERIES

Willy Braun, Mannheim, and Karl Koeberle, Ludwigshafen-on-the-Rhine, Germany, assignors to General Aniline Works, Inc., New York, N. Y., a corporation of Delaware No Drawing. Application October 6, 1937, Serial No. 167,530. In Germany October 13, 1936

16 Claims. (Cl. 260—261)

The present invention relates to compounds of the pyrimidine series and a process of producing them.

We have found that new valuable compounds of the pyrimidine series are obtained in a simple manner by causing aldehydes to act on ortho-aminocyano compounds or on ortho-aminocarboxylic acid amides in an acid medium.

As initial materials there may be mentioned any ortho-aminocyano compounds or ortho-amino carboxylic acid amides and any aldehydes. For example ortho-aminocyanobenzenes, ortho-aminocyanonaphthalenes, ortho-aminocyanoanthraquinones or ortho-aminocyano compounds of higher molecular weight, and also ortho-aminocyano compounds of heterocyclic compounds are suitable. Instead of primary amino compounds, there may also be used as initial materials secondary amines or amides of the said kind. Suitable aldehydes are for example formaldehyde, acetaldehyde, aldehydes of aliphatic compounds of high molecular weight (dodecyl, octodecyl and octodecenyl aldehydes), dialdehydes (glyoxal) or aldehyde carboxylic acids, unsaturated aldehydes (acrolein or crotonaldehyde), high molecular aldehydes which are unsaturated one or more times and their derivatives. Aldehydes of cyclic compounds, as for example aldehydes of the benzene, naphthalene, anthraquinone, pyrene, quinoline and anthrapyrimidine series are also suitable. The said aldehydes may also contain any desired other atoms or atomic groups. Instead of free aldehydes there may also be used their derivatives provided they behave as aldehydes under the reaction conditions, as for example polymerized aldehydes, such as trioxymethylene, paraldehyde and metaldehyde, and also azomethines, acetals, aldoximes and chloralhydrate, and also the omega-dihalogen compounds corresponding to the aldehydes.

The reaction is carried out in an acid medium, as for example in the presence of strong sulphuric acid.

It is also possible to work in the presence of hydrochloric acid, phosphoric acid, nitric acid or a low molecular fatty acid, such as acetic acid. In many cases the reaction takes place even at ordinary temperature. When initial materials of high molecular weight are used, in particular when aldehydes of high molecular weight are used, it is preferable to heat the initial mixture. Generally speaking the yields correspond to the calculated yields and the final products are obtained in a very pure state. If necessary they may be purified in the usual way, as for example by recrystallization, sublimation, treatment with oxidizing agents or by way of their salts.

The dihydropyrimidines thus first formed may be converted into the pyrimidines which are poorer by two hydrogen atoms by means of a great variety of dehydrogenating agents, as for example with nitrous gases, thionyl chloride, hydrogen peroxide, ammonium persulphate, pyrolusite, potassium permanganate, potassium ferricyanide, oxygen or air, in many cases even without separating the dihydro compounds. The dehydrogenation may sometimes also be effected in a simple way by heating the reaction mixture. This procedure may be adopted in cases in which sulfuric acid was used as acid medium. When the resulting compounds contain hydroxyl groups on the pyrimidine nucleus, the said groups may readily be replaced by halogen. For example phosphorus trichloride, phosphorus tribromide, benzotrichloride, phosgene or another organic or inorganic acid chloride may be caused to act on them, in some cases in one working operation with the dehydrogenation. In many cases the said compounds themselves have a dehydrogenating action at the same time so that it is unnecessary to use a special dehydrogenating agent. The reaction proper as well as the dehydrogenation and any desired replacement of hydroxyl groups by halogen may, however, be carried out in separate working operation.

The pyrimidino compounds thus obtainable have, in part, valuable tinctorial properties. Thus they may be used in some cases for dyeing cellulose artificial silk, as vat dyestuffs or as pigments. In part, they may be used as initial materials for the preparation of dyestuffs, as medicaments or for the preparation of medicaments.

The following examples will further illustrate how the said invention may be carried out in practice but the invention is not restricted to these examples. The parts are by weight.

Example 1

4 parts of para-formaldehyde are introduced into a solution of 25 parts of 1-cyano-2-amino-anthraquinone in 250 parts of concentrated sulphuric acid and the mixture is stirred at from 25° to 30° C. for two hours. The whole is then poured onto ice, filtered by suction and the residue treated with aqueous ammonia and washed with water until neutral. 28 parts of a yellow-brown compound melting at from 300° to 305° C. are thus obtained. After dissolution in and precipitation from strong sulphuric acid or after recrystallization from nitrobenzene, it melts at from 312° to 314° C.

The py.4 - hydroxy-py.1.2 - dihydro - 2(N).1 - pyrimidinoanthraquinone having the constitution

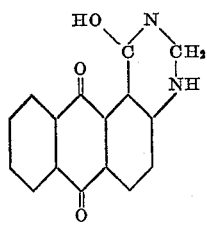

thus obtained dissolves in strong sulphuric acid giving a green coloration and in caustic soda solution giving a red-brown coloration and yields a red-brown vat. It dyes acetate artificial silk vivid yellow shades. By heating with thionyl chloride, there is obtained therefrom py.4-hydroxy-2(N)-1-pyrimidinoanthraquinone which is poorer by two hydrogen atoms and which may be sublimed under reduced pressure without decomposition whereby it yields yellow crystals. If the hydroxy-dihydro compound be treated while heating with phosphorus pentachloride in the presence of nitrobenzene, py.4-chlor-2(N).1-pyrimidinoanthraquinone is formed which dissolves in strong sulphuric acid giving a yellow coloration and which yields a red-brown vat.

By using 4.6 parts of paraldehyde instead of paraformaldehyde, 29 parts of a yellow-red colored compound are obtained which, according to analysis and its properties, is py.2-methyl-py.4-hydroxy-py.1,2-dihydro - 2(N).1 - pyrimidinoanthraquinone. It dyes acetate artificial silk yellow shades. Similarly by using 10 parts of benzaldehyde and carrying out the reaction for two hours at 80° C., py.2-phenyl-py.4-hydroxy-py.1,2-dihydro-2(N).1-pyrimidinoanthraquinone is obtained.

Example 2

A solution of 20 parts of 1-cyano-2-aminoanthraquinone, 200 parts of concentrated sulphuric acid and 10 parts of paraaminobenzaldehyde is heated for 2½ hours at from 75° to 80° C. and then worked up in the manner described in Example 1. 27 parts of a yellow-brown compound are thus obtained which dissolves in strong sulphuric acid giving a green coloration and which dyes cotton brownish yellow shades from a red-brown vat. The corresponding benzoylamino compound dyes cotton pure yellow shades.

From 1-aminoanthraquinone-2-aldehyde there is obtained in the same way a dyestuff which dyes cotton violet-red shades from a red-brown vat.

By treating 1,5-dicyano-2,6-diaminoanthraquinone with para-formaldehyde, the corresponding dipyrimidinoanthraquinone is obtained. Similarly 5-amino-6-cyano-1,9-anthrapyrimidine and para-chlorbenzaldehyde yield the corresponding pyrimidino - 1,9 - anthrapyrimidine. The compounds obtainable according to this example dye cotton from the vat from yellow to brown shades.

Example 3

A mixture of 25 parts of 1-amino-2-cyanoanthraquinone, 250 parts of concentrated sulphuric acid and 4 parts of para-formaldehyde is heated for 2½ hours while stirring at from 30° to 40° C. By working up the mixture in the manner described in Example 1, 27 parts of a red-brown compound are obtained which melts at from 295° to 296° C. and, after recrystallization from nitrobenzene, at from 300° to 302° C. The py.4-hydroxy-py.1,2-dihydro-1(N).2-pyrimidinoanthraquinone thus obtained dissolves in strong sulphuric acid giving a blue coloration and in caustic soda giving a red-brown coloration and yields a red vat. It dyes acetate artificial silk rose shades.

Example 4

A mixture of 100 parts of 2-amino-3-cyanoanthraquinone, 1000 parts of concentrated sulphuric acid and 15 parts of para-formaldehyde is treated in the manner described in Example 3. Pure py.4-hydroxy-py.1,2-dihydro-2(N).3-pyrimidinoanthraquinone is thus obtained in the calculated yield. It is brilliant red in color and melts at from 318° to 320° C.

It dissolves in strong sulphuric acid giving a powerful red coloration and in caustic soda solution giving a yellow-red coloration and yields a brilliant green vat. By treatment with thionyl chloride and nitrobenzene at 130° C. it is converted into the corresponding hydroxy-pyrimidinoanthraquinone which forms pale yellow crystals and is soluble in strong sulphuric acid giving a yellow-red coloration and in caustic soda solution giving a yellow coloration. The vat is brilliant green in color from which cotton is dyed yellow shades.

Example 5

A solution of 20 parts of 2-amino-3-cyanoanthraquinone, 200 parts of concentrated sulphuric acid and 5.5 parts of terephthalic dialdehyde is heated for two hours at from 60° to 70° C. and then worked up in the manner described in Example 1. 25 parts of a compound are thus obtained which dyes cotton pale yellow shades from a green vat. By treatment with phosphorus pentachloride in nitrobenzene, it is converted into a dyestuff which is also yellow.

By using phthalic or isophthalic dialdehyde instead of terephthalic dialdehyde, yellow dyestuffs are also obtained. With 1-aminoanthraquinone-2-aldehyde there is obtained a dyestuff which dyes cotton from a green vat violet red shades and acetate artificial silk brilliant yellow-red shades.

Example 6

A mixture of 20 parts of 2-amino-3-cyanoanthraquinone, 200 parts of concentrated sulphuric acid and 20 parts of glyoxal sulphate is heated for 2 hours at from 70° to 80° C. By working up, a dyestuff is obtained which dyes cotton brown-yellow shades from a green vat.

Example 7

A solution of 20 parts of anthranilic amide in 200 parts of concentrated sulphuric acid is stirred with 5 parts of para-formaldehyde for one hour at from 35° to 40° C. By working up, 15 parts of a pale yellow compound are obtained which after recrystallization from alcohol melts at between 218° and 220° C. The compound has the following constitution:

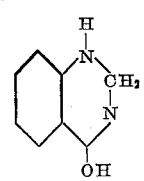

Example 8

6 parts of para-formaldehyde are added to a solution of 50 parts of 1-methylamino-2-cyanoanthraquinone in 500 parts of concentrated sulphuric acid and the solution is stirred for 2 hours at between 25° and 35° C. and further worked up by the manner indicated in Example 1. The resulting compound having the following constitution

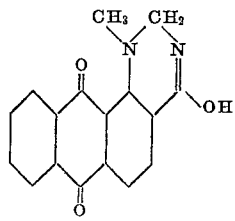

is obtained in nearly the theoretical yield. It is a claret-red powder which is soluble in strong sulphuric acid giving a green and in caustic soda solution giving a violet-red coloration. It forms a brown vat. The dyestuff is soluble in acetone giving a violet-red coloration and dyes acetate artificial silk strong red shades.

Compounds having similar properties are obtained by starting from 1-phenylamino-2-cyanoanthraquinone, 1(p'-chlorophenylamino)- or 1(p'-methoxyphenylamino) - 2-cyanoanthraquinone.

*Example 9*

A solution of 100 parts of 2-amino-3-cyanoanthraquinone, 126 parts of the azomethine from 1-aminoanthraquinone-2-aldehyde and aniline, and 200 parts of concentrated sulphuric acid is heated for 3 hours at from 100° to 120° C. After working up in the usual manner a dyestuff is obtained in almost the calculated yield which gives a green vat from which cotton is dyed violet-red shades. It dyes acetate artificial silk brilliant yellowish red shades.

*Example 10*

A solution of 5 parts of 1-amino-2-cyanoanthraquinone, 6 parts of 2-(omega-dichlormethyl)-anthraquinone and 110 parts of concentrated sulphuric acid is heated for some hours at from 115 to 120° C. The dyestuff obtained after working up in the usual manner has the following constitution:

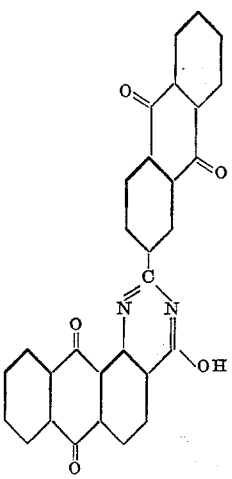

It forms a brown vat from which cotton is dyed yellow-brown shades.

*Example 11*

A solution of 150 parts of 2-amino-3-naphthoic amide, 203 parts of 1-aminoanthraquinone-2-aldehyde and 2500 parts of concentrated sulphuric acid is heated for 3-4 hours at from 80° to 90° C. The dyestuff formed is soluble in strong sulphuric acid giving a brown vat, and in caustic soda solution giving a claret-red coloration; it forms a green vat from which cotton is dyed brown-red shades.

*Example 12*

A solution of 200 parts of 2-amino-3-cyanoanthraquinone, 125 parts of terephthalaldehyde acid and 2000 parts of concentrated sulphuric acid is heated for 3 hours at 80° C. A red-brown compound (melting point at between 328° and 330° C.) is thus obtained in the calculated yield; it is soluble in strong sulphuric acid giving a brilliant red, and in dilute soda solution giving a yellow-red coloration. It forms a green vat from which cotton is dyed yellow shades. The compound has the following constitution:

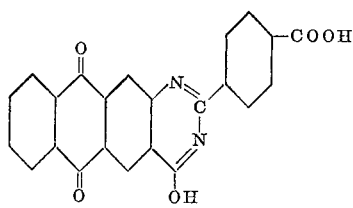

*Example 13*

A solution of 150 parts of 2-amino-3-cyanoanthraquinone, 161 parts of 1-aminoanthraquinone-2-aldoxime and 3300 parts of concentrated sulphuric acid is heated for 3 hours at from 80° to 90° C. and worked up in the usual manner. The resulting dyestuff which is identical with that obtained according to Example 9 is obtained in the calculated yield.

*Example 14*

A solution of 150 parts of 1-cyan-2-aminobenzene and 58 parts of para-formaldehyde in 1500 parts of 50 per cent sulphuric acid is stirred at from 50° to 60° C. for 1½-2 hours. After working up a pale yellow compound is obtained which is identical with that obtained according to Example 7. Instead of sulphuric acid 38 per cent hydrochloric acid or 20 per cent nitric acid may be employed.

*Example 15*

A solution of 150 parts of 1-cyan-2-aminobenzene, 138 parts of benzaldehyde and 800 parts of concentrated sulphuric acid is heated while stirring at about 70° C. for 2 hours. A pale yellow compound having the following constitution is obtained in a very good yield.

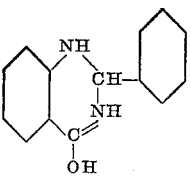

*Example 16*

A solution of 20 parts of 1-cyan-2-amino-4-chlorbenzene and 4 parts of para-formaldehyde in 120 parts of concentrated sulphuric acid is stirred at from 20° to 30 C. for 3 hours. After working up the compound having the following constitution is obtained in a theoretical yield:

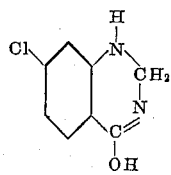

If acrolein is employed instead of para-formaldehyde, an almost colorless compound is obtained in a good yield. The compound melts at between 230° and 232° C. and has the following constitution:

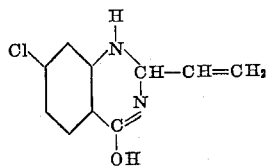

Example 17

A solution of 150 parts of 2-amino-3-cyanoanthraquinone, 125 parts of N-methyl-alpha-methyl-beta-dimethyl-alpha, beta-dihydroindol-5-aldehyde and 150 parts of concentrated sulphuric acid is stirred at from 25° to 30° C. for 3 hours and worked up in the usual manner. A red-brown compound (melting point 286° C.) is obtained in a very good yield. It forms a green vat from which cotton is dyed brownish yellow shades.

If furfurol is employed instead of the aforesaid indol-aldehyde, a yellow compound being soluble in strong sulphuric acid and giving an olive-green coloration is obtained. Cotton is dyed from a green vat yellow shades.

Example 18

A solution of 15 parts of 1-amino-2-cyanoanthraquinone and 10 parts of chloralhydrate in 150 parts of concentrated sulphuric acid is heated while stirring at 30° C. for 2 hours. After working up in the usual manner 19 parts of an orange red compound (melting points 216–217° C.) are obtained. The compound is soluble in strong sulphuric acid giving a blue, in alkalies giving a pale red coloration. It has the following constitution:

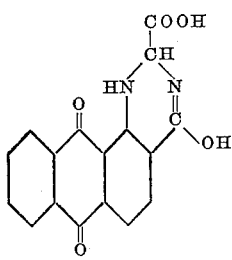

and dyes acetate artificial silk brilliant orange-yellow shades. Its vat is brown-red.

Example 19

A solution of 10 parts of 1-aminoanthraquinone-2-carboxylic acid methylamide, 2 parts of para-formaldehyde and 100 parts of concentrated sulphuric acid is heated while stirring at 30° C. for 3 hours. A brown-red compound giving a brown-red vat is obtained in a very good yield. It has the following constitution:

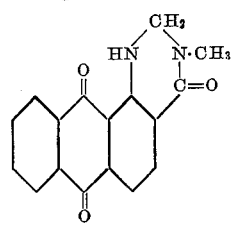

and dyes acetate artificial silk brilliant orange-red shades.

Example 20

A solution of 100 parts of 5-amino-6-cyan-1,9-anthrapyrimidine (obtainable by heating 5-amino-6-brom-1,9-anthrapyrimidine with cuprous cyanide in pyridine in a pressure-tight vessel) and 93 parts of 1-aminoanthraquinone-2-aldehyde in 5270 parts of concentrated sulphuric acid is heated while stirring at 90° C. for 3 hours. The resulting dyestuff is soluble in strong sulphuric acid giving a green, and in alkalies giving a violet-red coloration. It dyes cotton from a brown-red vat reddish violet shades.

Example 21

75 parts of diethylacetale are dropped while stirring into a solution of 150 parts of 2-amino-3-cyanoanthraquinone in 1500 parts of concentrated sulphuric acid while keeping the temperature at from 30–35° C. for 2 hours. A red brown compound which according to analysis is py.4-hydroxy-py.2-methyl-py.1,2-dihydro-2(N).3-pyrimidinoanthraquinone, is obtained in a very good yield. It is soluble in strong sulphuric acid giving a brilliant red coloration and dyes acetate artificial silk brilliant yellow-orange shades. It yields a green vat.

If crotonaldehyde or oleylaldehyde is employed instead of diethylacetale compounds having similar properties are obtained.

Example 22

15 parts of 4-chlor-2-amino-1-cyanobenzene are added while stirring at from 110° to 120° C. into a solution of 11 parts of benzaldehyde in 150 parts of 89 per cent phosphoric acid. The mixture is then heated at from 140° to 150° C. for about 1 hour and then poured into water. The precipitate is filtered off by suction and washed with water and methanol. After recrystallizing from o-dichlorbenzene the compound having the following constitution

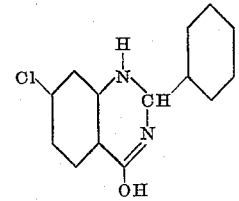

is obtained in the form of colorless needles (melting point 250° C.).

Similar compounds are obtained if instead of 4-chlor-2-amino-1-cyanobenzene 4-amino- or 4-methoxy-2-amino-1-cyanobenzene is employed.

Example 23

10 parts of 2,3-aminonaphthoic amide are dissolved while heating in 200 parts of 50 per cent acetic acid. Then 3 parts of para-formaldehyde are added at 90° C. The mixture is further heated at from 90° to 100° C. for half an hour. The resulting pale yellow precipitate is filtered off by suction and washed with water. The compound is soluble in strong sulphuric acid giving a red brown coloration and a powerful blue green fluorescence. According to analysis it is py.4-hydroxy-py.1,2-dihydro-2(N).3-pyrimidinonaphthalene having the following constitution

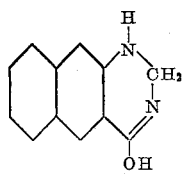

The compound may be used as starting material for the preparation of dyestuffs.

Example 24

A solution of 50 parts of 1,4-diamino-2-cyano-anthraquinone in 500 parts of concentrated sulphuric acid is stirred, after the addition of 15 parts of paraformaldehyde, for 2 hours at from 35° to 40° C. After working up, a dyestuff is obtained which dyes acetate artificial silk brilliant blue shades.

If, instead of the para-formaldehyde, a solution of 50 parts of 1-aminoanthraquinone-2-aldehyde in 500 parts of concentrated sulphuric acid is employed and the mixture is stirred for 2 hours at from 80° to 90° C., a dyestuff is obtained which dyes cotton from a brown vat blue-violet shades.

What we claim is:

1. A process of producing compounds of the pyrimidine series which comprises reacting a cyclic compound having a benzene ring to which are attached a group —NHR, R being a member of the group consisting of hydrogen, alkyl and aryl, and in ortho position to the said group a group selected from the class consisting of —CN and —CONH₂, with an aldehyde in an acid medium.

2. A process of producing compounds of the pyrimidine series which comprises reacting a cyclic compound having a benzene ring to which are attached a group —NHR, R being a member of the group consisting of hydrogen, alkyl and aryl, and in ortho position to the said group a group selected from the class consisting of —CN and —CONH₂, with an aldehyde in an acid medium and treating the resulting compound with a dehydrogenating agent.

3. A process of producing compounds of the pyrimidine series which comprises reacting a cyclic compound having a benzene ring to which are attached a group —NHR, R being a member of the group consisting of hydrogen, alkyl and aryl, and in ortho position to the said group a group selected from the class consisting of —CN and —CONH₂, with an aldehyde in an acid medium and treating the resulting compound with the chloride of an inorganic acid.

4. A process of producing compounds of the pyrimidine series which comprises reacting a cyclic compound having a benzene ring to which are attached a group —NHR, R being a member of the group consisting of hydrogen, alkyl and aryl, and in ortho position to the said group a group selected from the class consisting of —CN and CONH₂, with an aldehyde in the presence of sulphuric acid.

5. A process of producing compounds of the pyrimidine series which comprises reacting an anthraquinone having a group —NHR, R being a member of the group consisting of hydrogen, alkyl and aryl, and in ortho position to the said group a group selected from the class consisting of —CN and —CONH₂, with an aldehyde in the presence of sulphuric acid of high percentage strength.

6. A process of producing compounds of the pyrimidine series which comprises reacting an anthraquinone having a group —NHR, R being a member of the group consisting of hydrogen, alkyl and aryl, and in ortho position to the said group a group selected from the class consisting of —CN and —CONH₂, with an aromatic aldehyde in the presence of sulphuric acid of high percentage strength.

7. A process of producing compounds of the pyrimidine series which comprises reacting an anthraquinone having a group —NHR, R being a member of the group consisting of hydrogen, alkyl and aryl, and in ortho position to the said group a group selected from the class consisting of —CN and —CONH₂, with an anthraquinone aldehyde in the presence of sulphuric acid of high percentage strength.

8. A polynuclear 4-hydroxy-Pyl.2-dihydropyrimidine.

9. A polynuclear hydroxy-dihydropyrimidine of the general formula

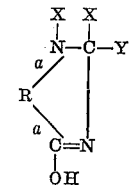

wherein R is the radical of a cyclic compound, the linkages marked $a$ being in ortho position and connected to a benzene ring, X is a member of the class consisting of hydrogen and alkyl, and Y is an organic radical connected through a carbon atom thereof.

10. A polynuclear hydroxy-dihydropyrimidine of the general formula

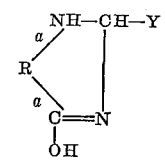

wherein R is the radical of a cyclic compound, the linkages marked $a$ being in ortho position and connected to a benzene ring, and Y is an organic radical connected through a carbon atom thereof.

11. A polynuclear hydroxydihydropyrimidine of the general formula

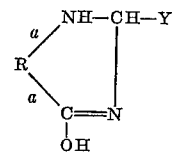

wherein R is the radical of an aromatic compound, the linkages marked $a$ being in ortho position and connected to a benzene ring, and Y is an organic radical connected through a carbon atom thereof.

12. A polynuclear hydroxy-dihydropyrimidine of the general formula

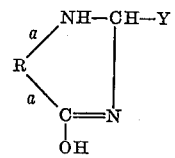

wherein R is the radical of a vattable para-quinoidic aromatic compound and connected to a benzene ring, the linkages marked $a$ being in ortho position, and Y is an organic radical connected through a carbon atom thereof.

13. A polynuclear hydroxy-dihydropyrimidine of the general formula

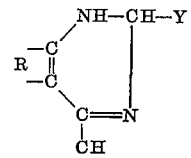

wherein R is a grouping of the class consisting of
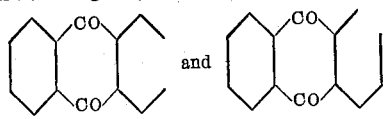
and Y is an organic radical connected through a carbon atom thereof.
14. A phthaloylbenzo-4-hydroxy-1.2-dihydropyrimidine.
15. A phthaloylbenzo - pyC₂aryl - pyC₄hydroxy-1.2-dihydropyrimidine.
16. The pyrimidino compound of the formula
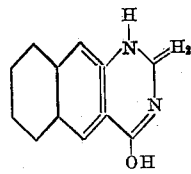
WILLY BRAUN.
KARL KOEBERLE.